US011516547B2

United States Patent
Mitchard et al.

(10) Patent No.: US 11,516,547 B2
(45) Date of Patent: Nov. 29, 2022

(54) MULTI-FILE STREAMING MEDIA DELIVERY SYSTEM AND METHOD

(71) Applicant: OKTEIN TECHNOLOGY LIMITED, London (GB)

(72) Inventors: George Mitchard, London (GB); Adam Istvan Merten, London (GB)

(73) Assignee: OKTEIN TECHNOLOGY LTD, London (GB)

(*) Notice: Subject to any disclaimer, the term of this patent is extended or adjusted under 35 U.S.C. 154(b) by 0 days.

(21) Appl. No.: 17/293,259

(22) PCT Filed: Nov. 14, 2019

(86) PCT No.: PCT/EP2019/081306
§ 371 (c)(1),
(2) Date: May 12, 2021

(87) PCT Pub. No.: WO2020/099551
PCT Pub. Date: May 22, 2020

(65) Prior Publication Data
US 2022/0021941 A1  Jan. 20, 2022

Related U.S. Application Data

(60) Provisional application No. 62/767,115, filed on Nov. 14, 2018.

(51) Int. Cl.
*H04N 21/2187* (2011.01)
*H04N 21/8547* (2011.01)
(Continued)

(52) U.S. Cl.
CPC ... *H04N 21/47217* (2013.01); *G06F 3/04842* (2013.01); *G06F 3/04883* (2013.01);
(Continued)

(58) Field of Classification Search
CPC ....... H04N 21/47217; H04N 21/21805; H04N 21/2187; H04N 21/812; H04N 21/8547; G06F 3/04842; G06F 3/04883
See application file for complete search history.

(56) References Cited

U.S. PATENT DOCUMENTS

| 8,472,779 B2 * | 6/2013 | Lee ...................... G11B 27/005 |
| | | 386/343 |
| 2007/0039032 A1 * | 2/2007 | Goldey .............. H04N 21/8106 |
| | | 725/35 |

(Continued)

FOREIGN PATENT DOCUMENTS

| CN | 104320707 A * | 1/2015 | |
| WO | WO-2016039496 A1 * | 3/2016 | ........... G06F 1/1626 |
| WO | 2017208121 A1 | 12/2017 | |

OTHER PUBLICATIONS

WIPO, International Search Report received in International Application No. PCT/EP2019/081306, dated Jan. 28, 2020, (4p.).

(Continued)

*Primary Examiner* — Thai Q Tran
*Assistant Examiner* — Jose M Mesa
(74) *Attorney, Agent, or Firm* — Siritzky Law, PLLC

(57) ABSTRACT

A method includes rendering a portion of first video on a display associated with a device; and, in response to a first user gesture and/or interaction on and/or with a touch-sensitive interface, selecting a second video, and rendering a portion of the second video on the display, wherein the first user gesture and/or interaction corresponded to a first time in the first video, and wherein the portion of the second video
(Continued)

begins a second time in the second video corresponding substantially to the first time in the first video. The method may include, in response to a second user gesture and/or interaction on and/or with the touch-sensitive interface, selecting a third video, and rendering a portion of the third video on the display, wherein the second user gesture and/or interaction corresponded to a second time in the second video, and wherein the portion of the third video begins a third time in the third video corresponding substantially to the second time in the second video.

30 Claims, 12 Drawing Sheets

(51) Int. Cl.
    *G06F 3/04842*     (2022.01)
    *G06F 3/04883*     (2022.01)
    *H04N 21/472*     (2011.01)
    *H04N 21/218*     (2011.01)
    *H04N 21/81*     (2011.01)

(52) U.S. Cl.
    CPC ... *H04N 21/2187* (2013.01); *H04N 21/21805* (2013.01); *H04N 21/812* (2013.01); *H04N 21/8547* (2013.01)

(56) References Cited

U.S. PATENT DOCUMENTS

| | | | |
|---|---|---|---|
| 2009/0174677 A1 | 7/2009 | Gehani et al. | |
| 2011/0154415 A1* | 6/2011 | Kim | H04N 21/4331 725/95 |
| 2012/0050185 A1 | 3/2012 | Davydov et al. | |
| 2013/0223812 A1* | 8/2013 | Rossi | H04N 21/47217 386/230 |
| 2013/0302005 A1* | 11/2013 | Harwell | H04N 21/2743 386/E5.002 |
| 2014/0270684 A1 | 9/2014 | Jayaram et al. | |
| 2015/0026728 A1* | 1/2015 | Carter | H04N 21/47815 725/43 |
| 2015/0262402 A1 | 9/2015 | Heinz, II et al. | |
| 2015/0370402 A1 | 12/2015 | Checkley et al. | |
| 2016/0111128 A1* | 4/2016 | Nowak | H04N 5/77 386/219 |
| 2016/0127772 A1* | 5/2016 | Tsiridis | H04N 21/4424 725/41 |
| 2017/0236551 A1* | 8/2017 | Leiberman | G11B 27/28 386/285 |
| 2018/0255332 A1 | 9/2018 | Heusser | |

OTHER PUBLICATIONS

WIPO, International Written Opinion received in International Application No. PCT/EP2019/081306, dated Jan. 28, 2020, (13p.).

* cited by examiner

1. Interaction detected at 1 second
2. Timecode is multiplied by 4
3. Second video signal starts playing from 4 seconds
4. Interaction stops or 2nd interaction is detected at 10 seconds
5. Timecode is divided by 4
6. Original video starts playing at 2.5 seconds 1. Interaction detected at 4 seconds
2. Timecode is matched on the 2nd stream
3. Camera 2 video stream starts playing from 4 seconds
4. Interaction stops or 2nd interaction is detected at 8 seconds
5. Timecode is matched on the 3rd stream
6. Camera 3 video stream starts playing at 8 seconds

MULTI-FILE STREAMING MEDIA DELIVERY SYSTEM AND METHOD

REFERENCE TO PRIOR APPLICATIONS

This application is a National Stage (under 35 USC 371) of International Application No. PCT/EP2019/081306, filed 14 Nov. 2019 which claims the benefit of U.S. Provisional Application No. 62/767,115, filed Nov. 14, 2018, the entire contents of both of which are hereby fully incorporated herein by reference for all purposes.

COPYRIGHT STATEMENT

This patent document contains material subject to copyright protection. The copyright owner has no objection to the reproduction of this patent document or any related materials in the files of the United States Patent and Trademark Office, but otherwise reserves all copyrights whatsoever.

FIELD OF THE INVENTION

This invention relates to media streaming, and in particular, to the interchanging between multiple files of streaming media.

BACKGROUND

Streaming media has become a ubiquitous form of entertainment. However, controlling the characteristics of the streams (e.g., the playback speed, camera angle, music, etc.) is typically controlled by the streamer (not the viewer) and/or is cumbersome to implement.

Accordingly, there is a need for a system and method to enable viewers of streaming media to control aspects of the media (e.g., the playback speed, camera angle, music, etc.) easily and in real time.

SUMMARY

The present invention is specified in the claims as well as in the below description. Preferred embodiments are particularly specified in the dependent claims and the description of various embodiments.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

One general aspect includes a method of controlling simultaneous video streams to create different user experiences on any electronic computing device with a touch sensitive controller (both on display and a controller), the method including: outputting on a display the video content; automatically playing the video content or playing the video content when the user selects (e.g., clicks on) the content; detecting user interactions (e.g., simple touch, touch-and-hold, 3D touch (higher pressure touch) and/or swipe) on the touch sensitive interface; and, in response to a detected user interaction, the video player switching to another video stream (e.g., another stored video stream).

Other embodiments of this aspect include corresponding computer systems, apparatus, and computer programs recorded on one or more computer storage devices, each configured to perform the actions of the methods.

Implementations may include one or more of the following features, alone or in combination(s):
- A method where the stored video streams correspond to versions of a particular video stream at apparent different speeds and/or where the stored video streams correspond to versions of content recorded from different viewpoints.
- A method where the interaction is touch-and-hold, the method including: outputting on the display the video content; automatically playing the video content or playing the video content when the user selects (e.g., clicks on) the content; detecting a touch-and-hold interaction on the touch sensitive interface; in response to a touch-and-hold interaction the video player switching to an additional video stream; in response to a further 3D touch (higher pressure touch) interaction and/or an additional touch (e.g., from an additional finger) the video player switching to a further video stream; in response to detecting cessation of 3D touch (higher pressure touch) interaction and/or the additional touch the video player switching back to the previous video stream; and in response to detecting cessation of user contact the video player switching back to the first stream.
- A method where the video streams are synced using a time code in order to create a slow motion effect, the method including: seamlessly switching in between signals to make sure the playback point in time remains the same; using mathematical calculations to define the exact switching points between real time and slow motion video streams; optionally, using mathematical calculations to define the exact switching points between slow motion and further slow motion video streams, and using mathematical calculations to define the exact switching points between further slow motion back to the slow motion video streams; optionally, using mathematical calculations to define the exact switching points between further slow motion back to the original real time video streams; and using mathematical calculations to define the exact switching points between slow motion back to real time video streams.
- A method where the interaction is a simple touch, the method including: outputting on the display the video content; automatically playing the video content or playing the video content when the user selects (e.g., clicks on) the content; detecting a simple touch interaction on the touch sensitive interface; in response to a simple touch interaction the video player switching to an additional video stream; and in response to a further simple touch interaction the video player either switching back to the original video stream, or switching to (e.g. an unlimited number of) additional video streams, and eventually returning to the original video stream.
- A method where the video streams are synced using a time code in order to create a slow motion effect, the method including: seamlessly switching in between signals to make sure the playback point in time remains the same; using mathematical calculations to define the exact switching points between real time and slow motion video streams; using mathematical calculations to define the exact switching points between slow motion and further slow motion video streams; and using mathematical calculations to define the exact switching points between further slow motion back to the real time video streams.

A method where the video streams are synced using a time code in order to create a multi-camera playback effect, the method including: seamlessly switching in between signals to make sure the playback point in time remains the same; and using mathematical calculations to define the exact switching points between (e.g. unlimited) video streams of different camera angles.

A method where the interaction is a swipe, the method including: outputting on the display the video content; automatically playing the video content or playing the video content when the user selects (e.g., clicks on) the content; detecting a swipe interaction in any direction on the touch sensitive interface; in response to a swipe interaction the video player switching to an additional video stream; in response to a further swipe interaction in the same direction the video player switching to (e.g. an unlimited number of) additional video streams, and eventually returning to the original video stream; and in response to a further swipe interaction in the opposite direction the video player switching back to (e.g an unlimited number of) previous video streams, and eventually returning to the original video stream.

A method where the video streams are synced using a time code in order to create a slow motion effect, the method including: seamlessly switching in between signals to make sure the playback point in time remains the same; using mathematical calculations to define the exact switching points between real time and slow motion video streams; using mathematical calculations to define the exact switching points between slow motion and further slow motion video streams; using mathematical calculations to define the exact switching points between further slow motion back to the slow motion video streams; using mathematical calculations to define the exact switching points between further slow motion back to the original real time video streams; and using mathematical calculations to define the exact switching points between slow motion back to real time video streams. Implementations of the described techniques may include hardware, a method or process, or computer software on a computer-accessible medium.

The above methods describe switching points between video streams. The starting of a subsequent video stream is timed to match, as close as possible, the stop point of the former video stream. Hence, the meaning of exact switching points should be taken to mean that repetition or omission of content is preferably avoided, to the extent possible between two video streams of different apparent playback speeds.

One general aspect includes a method of playing an additional audio track separately from and simultaneously with a video stream, the method including: the audio track starting to play at the same time as the first video stream; the audio track being independent of controls taking place in the video stream and continuously playing without interruption; optionally the audio track being on a loop; and the audio track stopping to play when the video playback stops. Other embodiments of this aspect include corresponding computer systems, apparatus, and computer programs recorded on one or more computer storage devices, each configured to perform the actions of the methods.

One general aspect includes a method, for example, performed by one or more computing systems or devices, including: (a) rendering a portion of first video on a display associated with a device. The method also includes (b) in response to a first user gesture and/or interaction on and/or with a touch-sensitive interface, (b)(1) detecting selection of a second video, and (b)(2) in response to detecting the selection rendering a portion of said second video on said display. The method also includes where said first user gesture and/or interaction corresponds to a first time in said first video, and where rendering said portion of said second video begins at a second time in said second video corresponding substantially to said first time in said first video. Upon rendering the second video on the display, the second video may replace the first video, that is, the second video is interchanged with the first. Other embodiments of this aspect include corresponding computer systems, apparatus, and computer programs recorded on one or more computer storage devices, each configured to perform the actions of the methods.

Implementations may include one or more of the following features, alone or in combination(s):

The method further including: (c) in response to a second user gesture and/or interaction on and/or with said touch-sensitive interface, (c)(1) detecting selection of a third video, and (b)(2) rendering a portion of said third video on said display.

The method may also include where said second user gesture and/or interaction corresponds to a second time in said second video, and where said portion of said third video begins at a third time in said third video corresponding substantially to said second time in said second video.

The method where the third video is the first video.

The method where the second user gesture and/or interaction includes ceasing the first user gesture and/or interaction.

The method where the first gesture and/or interaction includes a touch-and-hold interaction on said touch-sensitive interface, and where said second gesture and/or interaction includes ceasing said touch-and-hold interaction.

The method where said second video includes a sped up or slowed down version of said first video.

The method further including: in response to said first user gesture and/or interaction, determining said second time, where said second time is determined based, at least in part, on said first time and on said first apparent video speed and said second apparent video speed.

The method where the first video plays in a first direction and wherein the second video comprises a version of the first video to play in a second direction, opposite said first direction. The method where the first direction is a forward direction and the second direction is a reverse direction. The method where the first video and the second video have the same duration.

The method where the first video and the second video are synchronized.

The method where the first video and the second video are synchronized using a time code.

The method where the first video was derived from the second video. The method, where the second video is a modified version of the first video.

The method where the second video includes aspects of the first video, modified to include images and/or text.

The method where the first video and the second video are stored on said device prior to said rendering in (a). Alternatively, the first and second video are streamed when selected.

The method where said device stores multiple video files and where said selecting in (b) includes selecting a particular file of said multiple video files.

The method where said multiple video files include video content stored at apparent different speeds.

The method where said multiple video files include video of the same content recorded at the same time from different viewpoints.

The method further including: automatically playing the first video or playing the first video when the user selects the first video.

The method where at least one gesture and/or interaction is associated with a corresponding action, and where said first gesture and/or interaction corresponds to an action of switching from a current playing video to a stored video.

The method where said at least one gesture and/or interaction is selected from one or more of: simple touch, touch-and-hold, 3D touch, touch from another finger, higher-pressure touch, and swipe on the touch-sensitive interface.

The method further including: in response to said first gesture and/or interaction, rendering at least a portion of a third video before rendering said portion of said second video in (b)(1).

The method where said third video includes sponsor or advertiser content.

The method where the third video is selected based on information about the user.

The method further including: (c) playing an audio track during said rendering in (a) and in (b)(1).

The method where the first video has a first audio track and the second video has a second audio track, and where the audio track played in (c) is distinct from the first audio track and from the second audio track.

The method where the audio track is played in (c) independent of which video is being rendered.

The method where the touch-sensitive interface is integrated in the display.

The method where the display is integrated in the device.

A skilled reader will understand, that any method described above or below and/or claimed and described as a sequence of steps or acts is not restrictive in the sense of the order of steps or acts.

Below is a list of method or process embodiments. Those will be indicated with a letter "M". Whenever such embodiments are referred to, this will be done by referring to "M" embodiments.

M1. A method comprising:
(A) rendering a portion of first video on a display associated with a device; and
(B) in response to a first user gesture and/or interaction on and/or with a touch-sensitive interface, (b)(1) selecting a second video, and (b)(2) rendering a portion of said second video on said display,
wherein said first user gesture and/or interaction corresponded to a first time in said first video, and wherein said portion of said second video begins a second time in said second video corresponding substantially to said first time in said first video.

M2. The method of embodiment M1, further comprising:
(C) in response to a second user gesture and/or interaction on and/or with said touch-sensitive interface, (C)(1) selecting a third video, and (b)(2) rendering a portion of said third video on said display,
wherein said second user gesture and/or interaction corresponded to a second time in said second video, and wherein said portion of said third video begins a third time in said third video corresponding substantially to said second time in said second video.

M3. The method of embodiment M2, wherein the third video is the first video.

M4. The method of embodiments M2 or M3, wherein the second user gesture and/or interaction comprises ceasing the first user gesture and/or interaction.

M5. The method of any one of the preceding embodiments, wherein the first gesture and/or interaction comprises a touch-and-hold interaction on said touch-sensitive interface, and wherein said second gesture and/or interaction comprises ceasing said touch-and-hold interaction.

M6. The method of any one of the preceding embodiments, wherein said first video is stored at a first apparent speed and wherein said second video comprises a version of said first video stored at a second apparent speed distinct from said first apparent speed.

M7. The method of embodiment M6, further comprising:
in response to said first user gesture and/or interaction, determining said second time, wherein said second time is determined based, at least in part, on said first time and on said first apparent speed and said second apparent speed.

M7-1. The method of one of the preceding embodiments, wherein the first video plays in a first direction and wherein the second video comprises a version of the first video to play in a second direction, opposite said first direction.

M7-2. The method of embodiment(s) M7-1, wherein the first direction is a forward direction and the second direction is a reverse direction.

M7-3. The method of embodiment(s) M7-1 to M7-2, wherein the first video and the second video have the same duration.

M8. The method of any one of the preceding embodiments, wherein the first video and the second video are synchronized.

M9. The method of embodiment M8, wherein the first video and the second video are synchronized using a time code.

M10. The method of embodiment M1, wherein the first video was derived from the second video.

M11. The method any one of the preceding embodiments, wherein the second video is a modified version of the first video.

M12. The method of embodiment M11, wherein the second video comprises aspects of the first video, modified to include images and/or text.

M13. The method of any one of the preceding embodiments, wherein the first video and the second video are stored on said device prior to said rendering in (A).

M14. The method of any one of the preceding embodiments wherein said device stores multiple video files and wherein said selecting in (B) comprises selecting a particular file of said multiple video files.

M15. The method of embodiment M14, wherein said multiple video files comprise video content stored at different speeds.

M16. The method of embodiments M14 or M15, wherein said multiple video files comprise video of the same content recorded at the same time from different viewpoints.

M17. The method of any one of the preceding embodiments, further comprising:
automatically playing the first video or playing the first video when the user selects the first video.

M18. The method of any one of the preceding embodiments, wherein at least one gesture and/or interaction is associated with a corresponding action, and wherein said first gesture and/or interaction corresponds to an action of switching from a current playing video to a stored video.

M19. The method of embodiment M18, wherein said at least one gesture and/or interaction is selected from one or more of: simple touch, touch-and-hold, 3D touch, touch from another finger, higher-pressure touch, and swipe on the touch-sensitive interface.

M20. The method of any one of the preceding embodiments, further comprising:
in response to said first gesture and/or interaction, rendering at least a portion of a third video before rendering said portion of said second video in (b)(M1).

M21. The method of embodiment M20, wherein said third video comprises sponsor or advertiser content.

M22. The method of any one of the preceding two embodiments, wherein the third video is selected based on information about the user.

M23. The method of any one of the preceding embodiments, further comprising:
(C) playing an audio track during said rendering in (A) and in (b)(1).

M24. The method of embodiment M23, wherein the first video has a first audio track and the second video has a second audio track, and wherein the audio track played in (C) is distinct from the first audio track and from the second audio track.

M25. The method of embodiments M23 or M24, wherein the audio track is played in (C) independent of which video is being rendered.

M26. The method of any one of the preceding embodiments, wherein the touch-sensitive interface is integrated in the display.

M27. The method of any one of the preceding embodiments, wherein the display is integrated in the device.

Below are system embodiments. Those will be indicated with a letter "S".

S28. A system comprising:
(a) hardware including memory and at least one processor, and
(b) a service running on said hardware, wherein said service is configured to: perform the method of any one of the preceding method embodiments M1-M27.

Below are article of manufacture embodiments. Those will be indicated with a letter "A".

A29. An article of manufacture comprising non-transitory computer-readable media having computer-readable instructions stored thereon, the computer-readable instructions including instructions for implementing a computer-implemented method, said method operable on a device comprising hardware including memory and at least one processor and running a service on said hardware, said method comprising the method of any one of the preceding method embodiments M1-M27.

The above features, along with additional details of the invention, are described further in the examples herein, which are intended to further illustrate the invention but are not intended to limit its scope in any way.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE PRESENTLY PREFERRED EXEMPLARY EMBODIMENTS

The term "mechanism," as used herein, refers to any device(s), process(es), service(s), or combination thereof. A mechanism may be implemented in hardware, software, firmware, using a special-purpose device, or any combination thereof. A mechanism may be mechanical or electrical or a combination thereof. A mechanism may be integrated into a single device or it may be distributed over multiple devices. The various components of a mechanism may be co-located or distributed. The mechanism may be formed from other mechanisms. In general, as used herein, the term "mechanism" may thus be considered shorthand for the term device(s) and/or process(es) and/or service(s).

Figure 1:
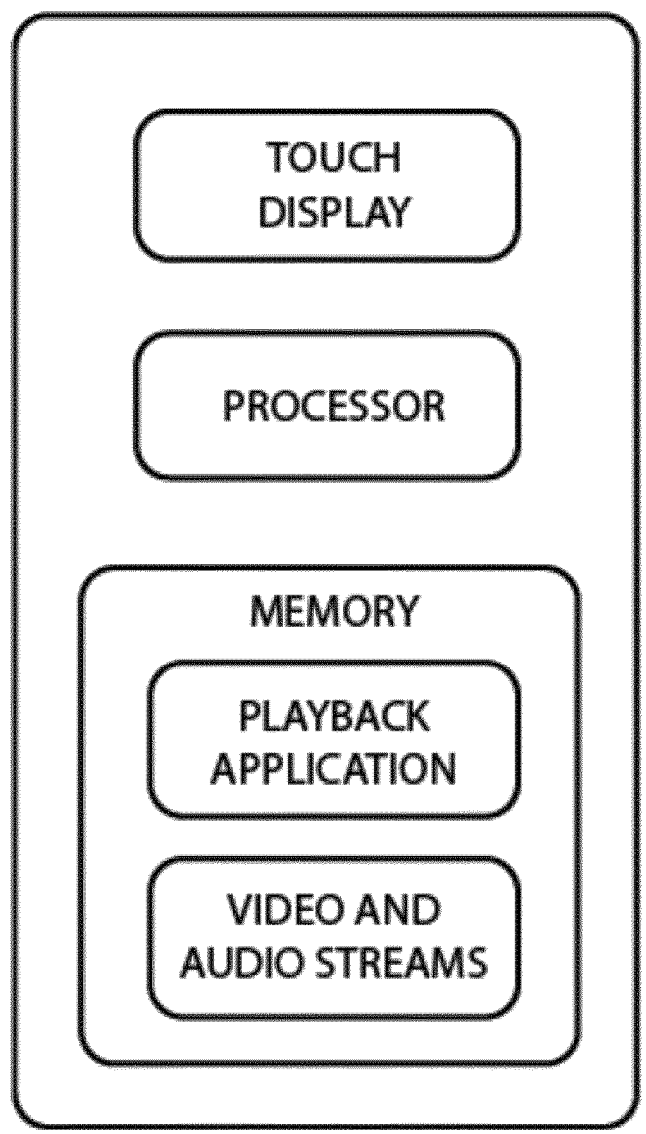
FIGS. 1-3 show aspects of example viewing devices according to exemplary embodiments hereof.
Figure 2:
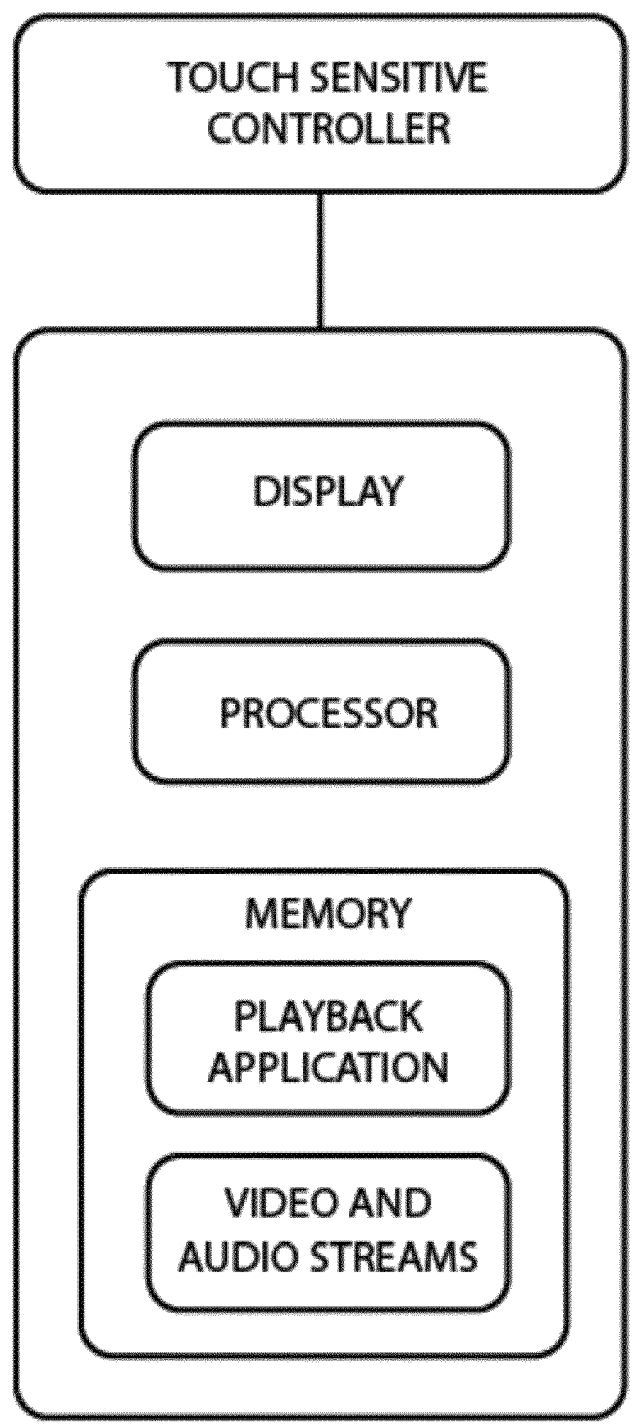
Figure 3:
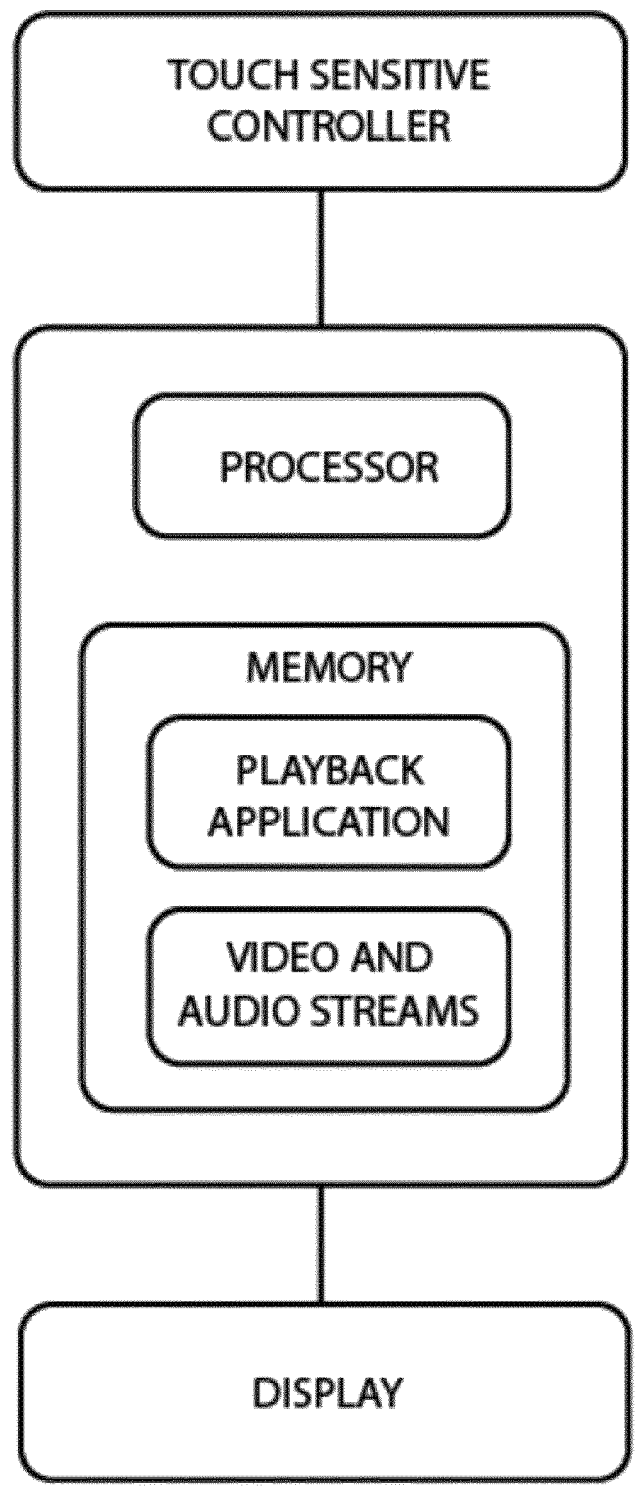

In general, a system according to exemplary embodiments hereof may provide multiple files of streaming media that may be interchanged, toggled between and viewed individually. The media may be streamed from a backend platform over a network (e.g., the Internet) and viewed by viewing devices. The viewing devices may include mobile devices (e.g., smart phones, tablet computers, portable music/video devices, etc.), personal computers, laptops, smart appliances (e.g., smart televisions and the like) or other types of viewing devices. It may be preferable that the viewing devices include touch-screens and/or touch sensitive devices, but other types of input/output interfaces or mechanisms such as a mouse, remote controls, and other types of devices may also be used. FIGS. 1-3 show example viewing devices but it is understood that other types of viewing devices may also be used.

The viewing devices may also include a mobile application ("app") or other type(s) of software or applications that may run on the viewing devices to provide at least some of the functionality of the system for viewing the streams. However, this may not be required.

The multiple files of streaming media may be distinct media files and/or different versions of the same or similar content.

The multiple files of streaming media may be synchronized with one another using timecodes or other types of synchronizing methods.

In one preferred implementation, the multiple files of streaming media may include substantially identical content displayed at different speeds (e.g., real time vs. slow-motion ("slow-motion")). In this way, a viewer may toggle between the files in order to view the media at seemingly different playback speeds.

In another preferred implementation, the multiple files of streaming media may include media taken from different camera angles of the substantially same or similar subject matter. In this way, a viewer may toggle between the files in order to view the subject matter in media from seemingly different angles and vantage points.

In another preferred implementation, the system may overlay, embed or otherwise incorporate special effects, branding, promotional content, graphics, messages, or other types of additional content and/or media with the content of one or more of the files of streaming media. In this way, when the user may toggle between different files (e.g., slow-motion files, different perspective files, etc.), the user may also view additional content that may be embedded into a new file.

The switching between the various files of streaming media may be accomplished using gestures performed on (or within proximity of) the viewing device. For example, touch-and-hold gestures, tap gestures (single or multiple), swiping gestures or other types of gestures or any combinations thereof may be performed on the touch screen of the viewing devices to trigger the different features of the system. The devices may also include facial recognition, voice recognition, gesture recognition, and/or other types of recognition applications that may recognize other types of gestures to trigger features of the system. It is understood that the scope of the system is not limited in any way by the types of gestures that may be used to trigger or otherwise control the functionalities of the system. FIGS. 4-7 depict various examples of different types of gestures, however, other types of gestures may also be used.

Gestures

As used herein, a gesture may refer to an action taken (e.g., by the user of a media viewing device (e.g., a mobile phone or the like)) that may be recognized by the device and/or that may trigger a change in some aspect of the streaming media being viewed (e.g., to rewind, fast forward, pause, play a different video, or take any other action and/or any combination thereof).

Figure 4:
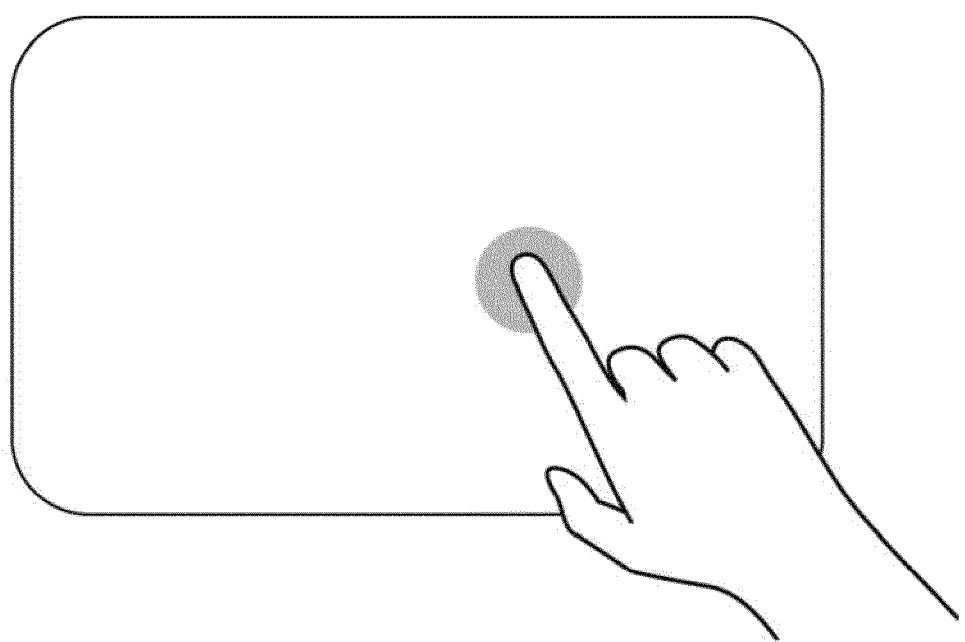
FIGS. 4-7 show aspects of example gestures to affect aspects of a media delivery system according to exemplary embodiments hereof.
Figure 5:
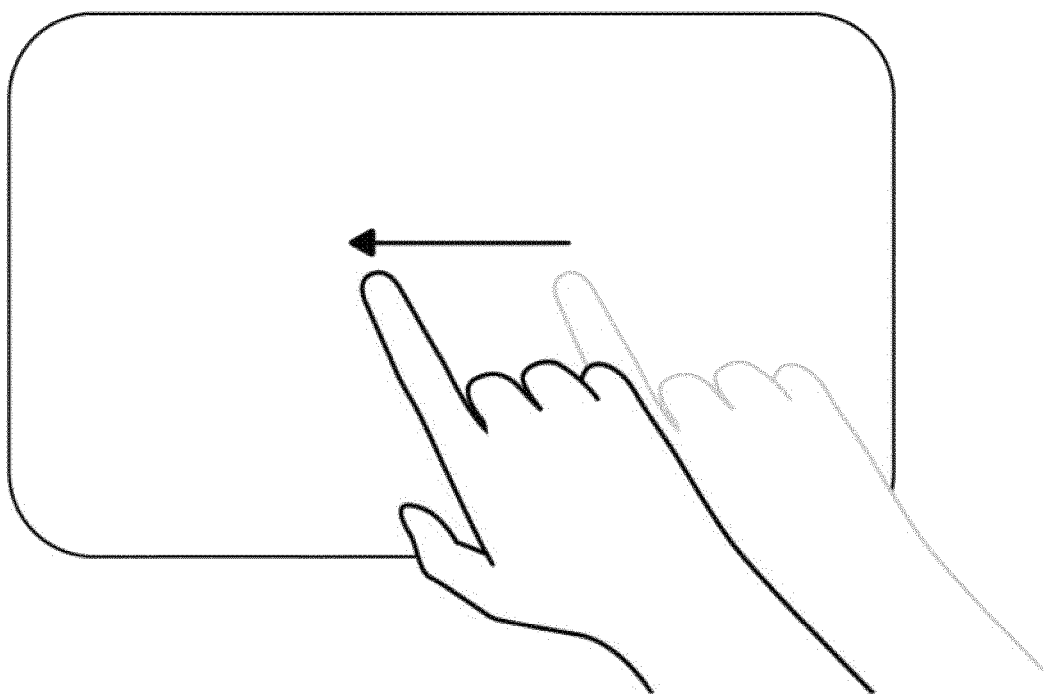
Figure 6:
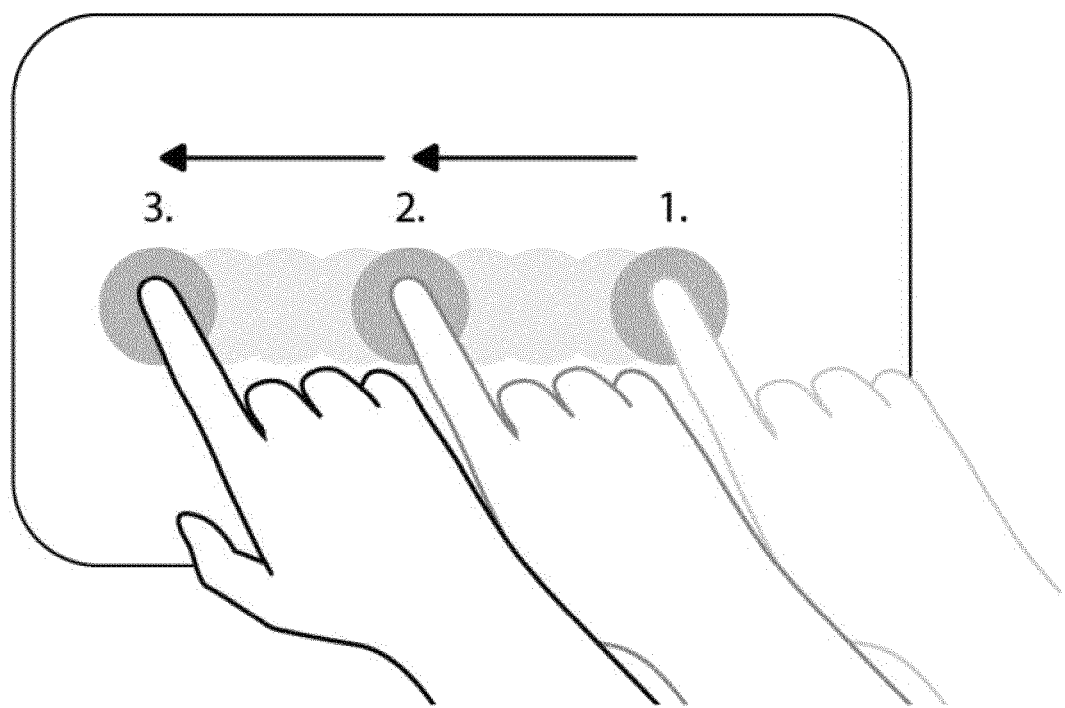
Figure 7:
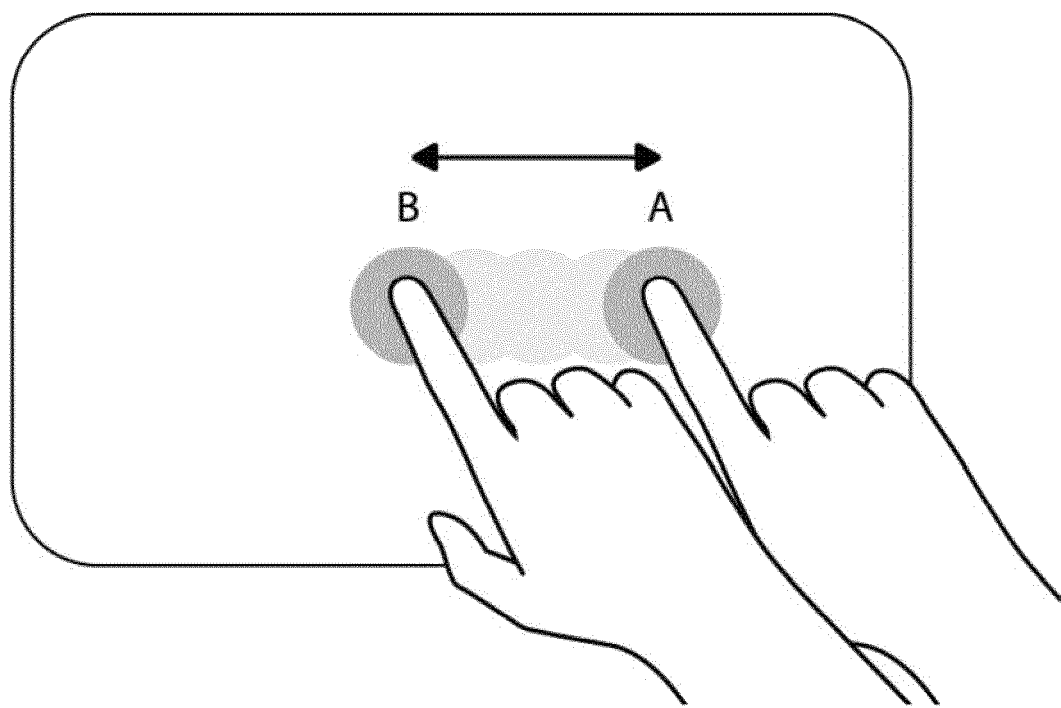

A gesture may include a particular touch interaction that the viewer may perform on the touch screen of the device. Example touch interactions may include, without limitation:
  A static hold as shown in FIG. 4: A touch and hold interaction where the viewer touches the touchscreen and holds the touch for a duration of time.
  A swipe to the left, right, up, down or in any other direction(s) as shown in FIG. 5.
  A static drag as shown in FIGS. 6 and 7: A touch and hold interaction combined with a sliding of the touch point to the left, right, up, down or in any other direction(s). Note that the touch point may be dragged in a first direction and then dragged in a second direction (e.g., in a direction opposite the first direction), and that the dragging in each distinct direction may trigger a different action.
  Any other type of touch interaction and any combination thereof.

In other preferred implementations, a gesture may include without limitation: hand gestures, facial gestures, body gestures, voice commands and other types of gestures and any combination thereof, and the system may include recognition application(s) as necessary to recognize the gestures.

For the purposes of this specification, the features of the system will be described in the form of various examples.

Slow Motion Playback

In a first example according to exemplary embodiments hereof, a viewer may use gestures to toggle between two streaming video files, with one video file including a real time representation of the content and the other video file representing a slow-motion representation of the same content.

The first video file may be a slow-motion clip exported and played back at a standard speed that may represent the passing of normal time (e.g., a frame rate of 30 fps). For the purposes of this specification, this may be referred to as normal time.

The second video file may be derived from the same slow-motion file but slowed down to 25% of the real time speed (at a frame rate of 120 fps) and exported and/or stored as a new 30 fps file, resulting in a 4 times longer video file.

Note that the first and second video files are preferably stored at the same frame rate (for example, a standard playback rate such as 30 fps), although they represent effective different speeds (relative to the real-time speed of the content).

Note that 30 fps and 120 fps are current mobile standards for frame rates, but the same can be achieved with any other base frame rates including without limitation 25 fps to 100 fps, etc.

In this example, the user may view the first video until such time that the user may wish to view the video in slow motion. At this point, the user may perform a gesture (e.g., a touch-and-hold gesture on the touch screen of his/her mobile phone) and the system may interchange the second video onto the user's display for the user to view. As stated above, this second video may be a slow-motion representation of the first video. When the user no longer wishes to view the stream in slow-motion (i.e., no longer wishes to view the second video file), the user may release the touch-and-hold gesture and the system may return to the displaying the first video (at a speed that may represent the passing of normal time).

The system is not limited to two files or streams only, and any number of files or streams may be utilized by the system. For example, using the touch-and-hold gesture (or other gestures) the system may also activate an additional file or stream using 3D Touch (a gesture that may involve pressing onto the touch screen with added pressure and/or with another finger) to play a 240 fps file exported as a new 30 fps file.

The system may also present files or streams that may represent the content slowed down even further (further slow-motion) when using very high frame rate videos (1000 fps). In this case, different types of gestures may be used to toggle between the normal time file and the slow-motion file, between the normal time file and the further slow-motion file, between the slow-motion file and the further slow-motion file, or between any combination thereof. The system may also toggle between the files in a predefine sequence such that each gesture toggles the system to the next file in the sequence.

An advantage of having different video files with different apparent playback speeds is that the content of the video at the different speeds runs smoothly because they are derived from higher frame rate slow motion video recording/files. Slowing down a conventional 30 fps recorded video would result in content having jerky or irregular motion.

It is understood by a person of ordinary skill in the art that the system may effectively use any number of files or streams that it may provide in any sequence and that the scope of the system is not limited in any way by the number of files or streams of streaming media that it may provide or utilize, by the gestures that may be used to toggle between the files, or by the sequence of the provided files.

In one example, a touch and hold gesture and a 3D touch gesture may be used to stream and toggle between the following sequence of files A, B, and C:

A-B-C-B-A or A-B-C-A where A is normal time, B is slow motion, and C is slower motion.

Using a simple touch or swipe the sequence of streaming files may be interchanged as A-B-C-A-B-C where A is real time, B is slow motion and C is further slower motion.

Figure 8:
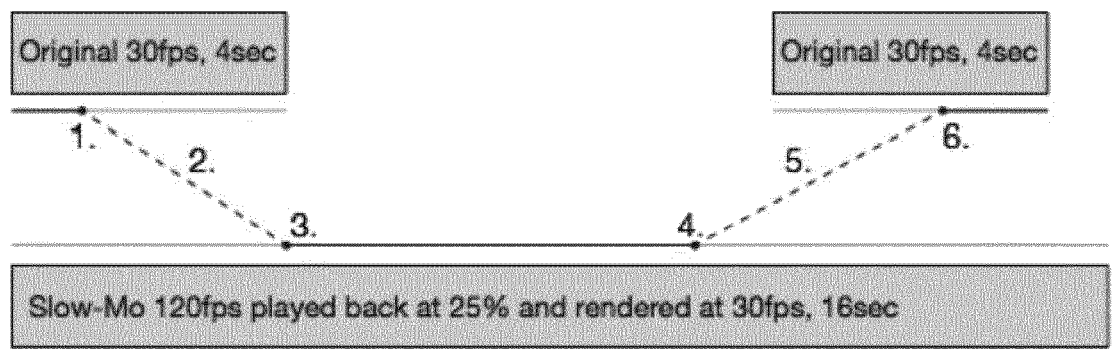
FIGS. 8 and 9 show aspects of a media delivery system according to exemplary embodiments hereof.

An exemplary way the timecode synchronization with two files of streaming media is depicted in FIG. 8. In this example, the first file of streaming media may include a 4 second video that may play at 30 fps (normal speed), and the second file may include a 16 second video at 120 fps played back at 25% and rendered at 30 fps. Although two files at two apparent speeds are shown, those of skill in the art will understand, upon reading this description, that this approach may be scaled to include additional numbers of files of streaming media at multiple apparent speed.

At 1: The first video is playing and an interaction (e.g., a gesture) is recognized by the system at 1 second.

At 2: The timecode is multiplied by a factor of 4 (due to the fact that the second video may play at 25% the speed of the first video).

At 3: The second video begins streaming (playing) at a position of 4 seconds into the second video (due to the fact that the first video played for 1 second and the second video is 25% the speed of the first video).

At 4: An interaction (e.g., a gesture) is recognized by the system at a position of 10 seconds into the second video.

At 5: The timecode is divided by a factor of 4 (due to the fact that the first video may play at a speed 4 times the second video).

At 6: The first video starts playing at a position of 2.5 seconds after the position where the first file was replaced by the second file (due to the fact that the second video played for 10 seconds and this corresponds to 2.5 seconds of the first video).

It is understood that the above example is meant for demonstration purposes and that any number of files at any play speeds may be used by the system. For example, a file at 240 fps may be played after the second file (e.g., triggered by a 3D touch gesture) at which time the timecode may be multiplied by a factor of 2. Upon returning to the second file, the timecode may then be divided by a factor of 2.

The above examples describe storing multiple files corresponding to various playback speeds. Those of skill in the art will understand, upon reading this description, that the different files may also (or instead) be used to achieve other effects (e.g., different colours, etc.)

In some cases, one or more of the files may encode a video in reverse. For example, two versions may be encoded, Version A being a normal video in the normal (forward) direction, and Version B being the reversed version of Version A, perhaps at a different speed. Then, while playing version A, a gesture (e.g., a drag to the left), may cause the device to switch from Version A (the original video) to Version B (the reverse video). This allows the system to create a rewind playback effect. If the effect is initiated by the user when Version A is playing at time T1 (i.e., offset T1 from the start of version A), then the start point in the second video (Version B) should be at the offset T1 from the end of Version B.

For example, if a video file has a length of 8 seconds, and the switch happens at 2 seconds, then the device switches to 6 seconds in the reversed playback and just plays it normally to create a rewind playback looking effect, even though the second video (Version B) was actually played in the forward direction.

In general, in some aspects, a device may store multiple video streams, one (a first stream) being at a first frame rate (e.g., normal speed), and the others being a of the same content as the first stream but at different frame rates). Some of the other videos may correspond to a reversed version of the first video. For example, if there are n view streams S1 . . . Sn, the i-th video stream Si is at frame rate Ri (and has a length Li). The frame rates may be any rate, but preferably include 30 fps and 120 fps. Some of the video streams may be derived from the others. For example, a first stream may have been recorded at 120 fps, and a second stream may be derived from the first stream to correspond to 30 fps.

In general, if multiple frame rates of the same video are desired, it is preferable to record the video at the highest rate and then derive the slower rate videos from that highest rate video. However, those of skill in the art will understand, upon reading this description, that different and/or other approaches may be used to determine the various video streams.

When a user selects a particular video, a device may pre-buffer related videos so as to expedite switching between video streams.

With multiple video streams stored in a device's memory, the application may recognize various gestures to switch between different ones of the stored streams.

Multi-Camera Playback

In a second example according to exemplary embodiments hereof, the viewer may use gestures to toggle between two streaming video files, with one video file including video taken from a first camera angle and one video file including video taken from a second (and preferable distinct) camera angle.

As with the first example, the system may utilize any number of different media files taken from any number of different camera angles. The files may all be synchronized with one another by a timecode or other type of synchronizing method.

In one preferred implementation, a playback timecode may be embedded in the video file(s).

In another preferred implementation, an SMTP time code fed by a primary camera or timecode generator may be fed into the secondary cameras (live broadcast environment).

In terms of interaction, the system may utilize any type of gestures or interactions to trigger the toggling of the video files, including but not limited to, a swipe gesture, a single tap, a touch-and-hold, a 3D touch or any other gesture and/or interaction and any combination thereof.

Figure 9:
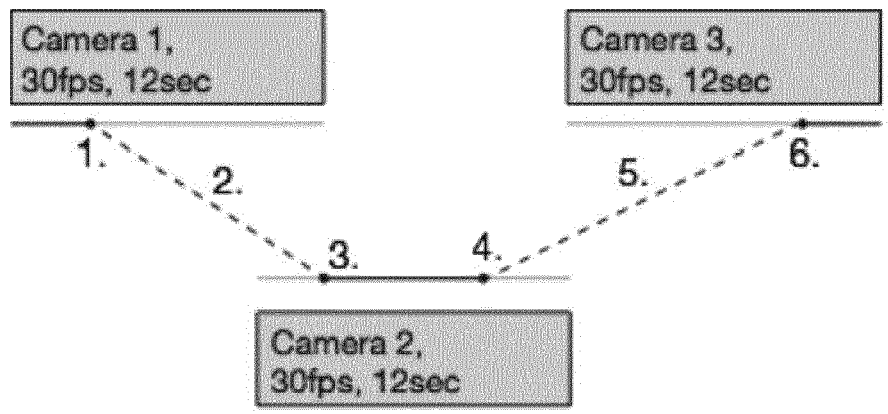

With a basic 3 camera setup, the switching between the real time individual streams is explained below with reference to FIG. 9.

At 1: The first video is playing and an interaction (e.g., a gesture) is recognized by the system at 4 seconds.

At 2: The timecode is matched on the second file (e.g., from a camera at a different vantage point).

At 3: The second video begins streaming (playing) at a position of 4 seconds into the second video.

At 4: An interaction (e.g., a gesture) is recognized by the system at a position of 8 seconds into the second video.

At 5: The timecode is matched on the third file.

At 6: The third video begins streaming (playing) at a position of 8 seconds.

It is understood that the above example is meant for demonstration purposes and that any number of files taken at any number of vantage points may be used by the system.

In general, in some aspects, a device may store multiple video streams, one (a first stream) having been recorded from first view point, and the others being of the same content as the first stream but recorded from different viewpoints. For example, if there are n view streams S1 . . . Sn, the j-th video stream Sj is recorded from the j-th viewpoint (and has a length Lj). The viewpoints are preferably distinct and may differ by distance, angle, orientation, type of lens used, etc.

As noted above, when a user selects a particular video, a device may pre-buffer related videos so as to expedite switching between video streams.

With multiple video streams stored in a device's memory, the application may recognize various gestures to switch between different ones of the stored streams.

As should be appreciated, the videos from different viewpoints may also be stored at different effective or apparent speeds. Thus, e.g., for at least some of the j video streams (from j different viewpoints), the system may determine and store one or more versions at different effective or apparent speeds. Thus, e.g., there may be a regular speed and a slow motion video stream from each of multiple viewpoints.

With multiple video streams (corresponding to multiple viewpoints and/or multiple frame rates) stored in a device's memory, the application may recognize various gestures to switch between different ones of the stored streams, thereby providing a user with a continuous stream of video formed from the various stored video streams and under the control of the user.

Interactive Video Content

In a third example according to exemplary embodiments hereof, the system may overlay, embed or otherwise incorporate special effects, branding, promotional content, graphics, messages, or other types of additional content and/or media with the content of one or more of the files of streaming media. In this way, when the user may toggle between different files (e.g., slow-motion files, different perspective files, etc.), the user may also view additional content that may be embedded into the new file.

In one example, the user may scroll down in his/her media feed and see the first video. The video may purposely be quick with a cliff-hanger (e.g., a clip of a boxing match that the users can see the video showing a popular boxer, they miss the punch making them want to watch it again). This first video is only played once, after which it automatically starts playing the second clip.

The second clip is the first timecode synced stream, playing in real time prompting the users to touch the screen to watch a replay. This video is on a loop, but to avoid the advertisement not being delivered, the system can set the completion of the loop to 2-3 times after which the advertisement, or other message, would play the last video. However it is very likely at this point that the users will interact. Other embodiments provide different numbers of loops before playing the last video.

When interaction is detected (e.g., a touch-and-hold or a simple tap) the third clip is played in slow motion using the method explained above in the slow motion playback section. In one example, the background may be darkened with added special effects to the punch to showcase the different treatments achievable on the individual streams.

If the interaction is touch-and-hold, the system can again set the completion to 2-3 loops to then deliver the final message. The system can also set up rules, e.g., if the user goes back to real time playback, the user may be allowed to interact one more time with the video before it may deliver the message.

If the system is using a single tap, it can quite simply set the completion to 2-3 loops before delivering the final message.

The final video clips plays once to deliver the message, after which it can loop back to the beginning of the ad.

This approach creates a very enjoyable and exiting new way to serve video ads, other video messages, graphics and/or animation. The video player can have "click here" buttons placed on top of the video stream, or anywhere around the container, preferably below with extra text, or similarly to Facebook with the text above the player.

Additional Stream of a Music Track

E.g., for Longer Clips

Most users on social platforms do not have sound on when using their mobile device to watch short clips. One exception may be Snapchat where users have limited time to watch the clips and therefore prepare by turning sound on before watching the clips.

However, for longer content, like content on YouTube, most people have sound on and enjoy listening to the voice together with music, rather than reading subtitles.

People also tend to watch longer edits in landscape full screen when sound is on.

One problem is that if a video is played at a slower speed, it slows down the original sound too, which makes it challenging to have music embedded in the video file.

A solution according to exemplary embodiments hereof is to have a constant loop of music independent of the video streams.

In one example according to exemplary embodiments hereof, the system may include the following:

Playback of the music track may be synchronized with the start of the video playback.

Both the music track and the sound effects embedded in the original video file play back at a lower volume, for example 90% of the original volume. This may avoid distortion when the two audio files play together.

When the user interacts with the video (e.g., to slow down the footage), the music track keeps playing, but the volume of the sound effects on the video file are reduced further to avoid too much distraction with the slow motion distorted sound.

When the video switches back to real time speed the volume of the sound effects embedded in the video file goes back up (e.g., to 90%).

In the case of the multi-camera playback, a swipe plays a different camera angle, and when the touch-to-slow interaction happens the music track keeps playing and the volume of the sound effects embedded in the video file will be reduced.

Tests have shown that users enjoyed this real time interactive editing to music so much that they tried to time the edit points to the beat of the music, which is exactly how professional video editing works.

As the video file is on a loop they have endless time to play with this and perfect their real time editing skills, for instance making a skateboarder land exactly on the beat of the music. Of course longer video files wouldn't have to be on a loop.

If the music runs out of time, it may simply loop, and if prepared properly the loop will sound seamless.

In addition, the app may record the edit points for slow-motion and users may then be able to export their own real time video edits to show to their friends (e.g., on social media).

Figure 10:
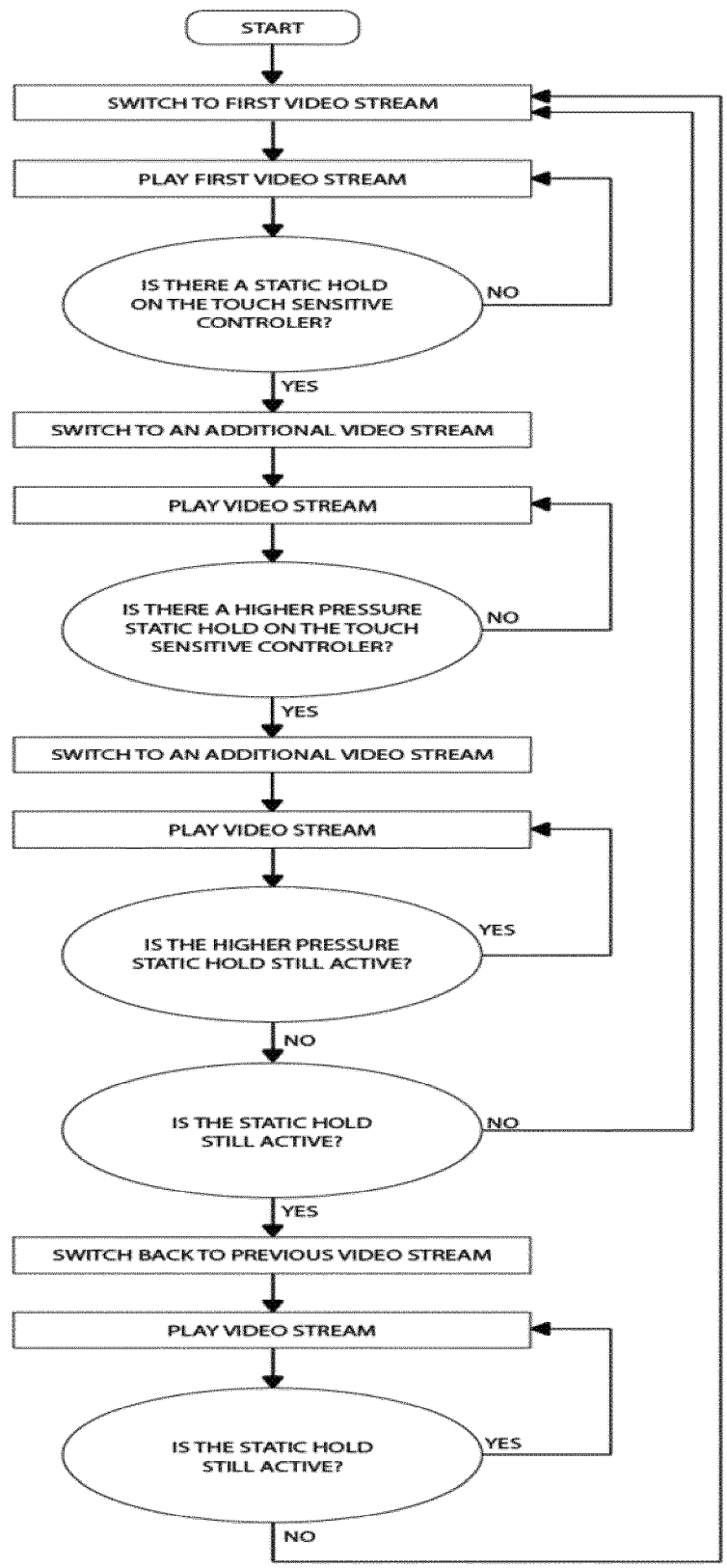
FIGS. 10-12 show example workflows of a media delivery system according to exemplary embodiments hereof.
Figure 11:
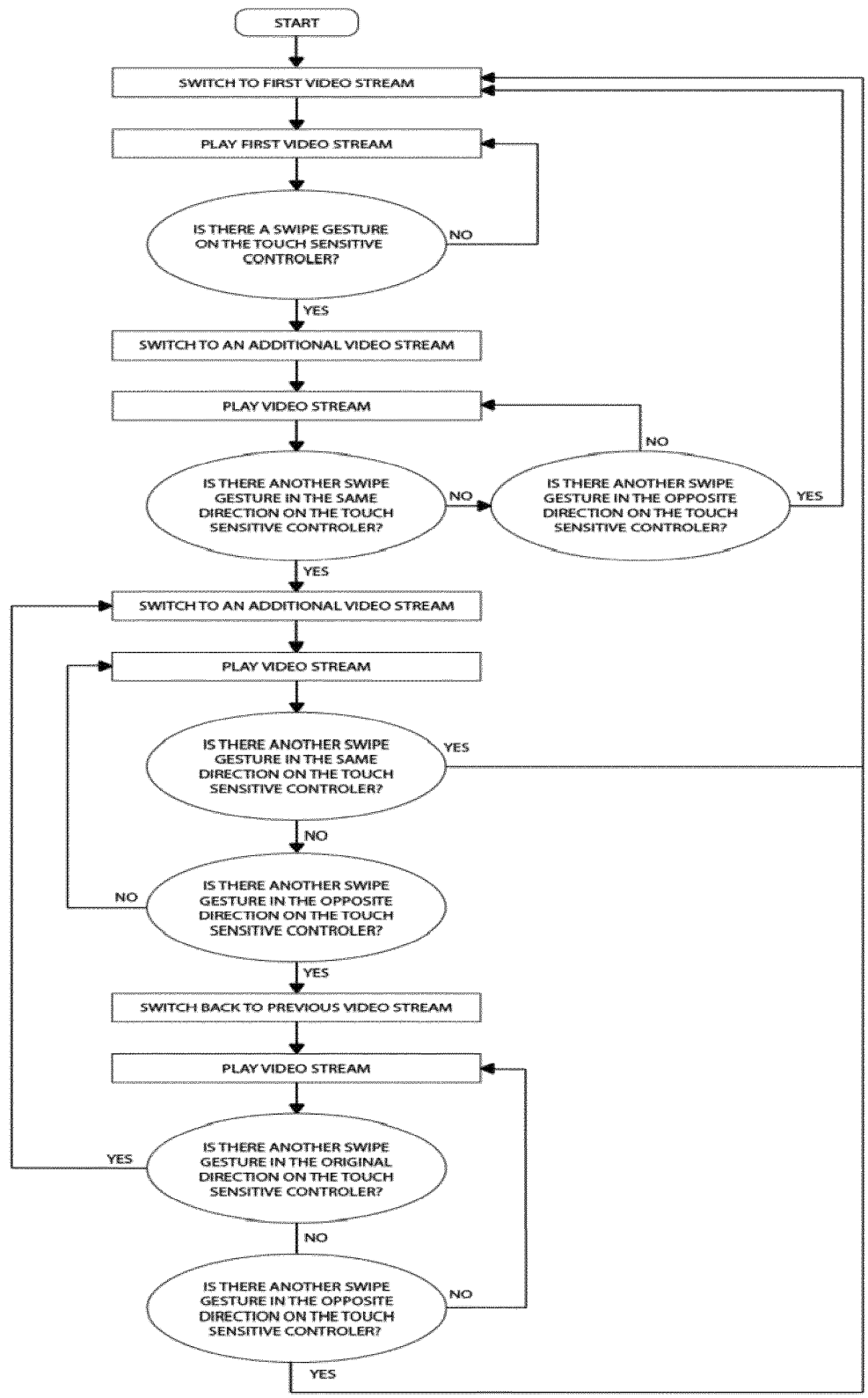
Figure 12:
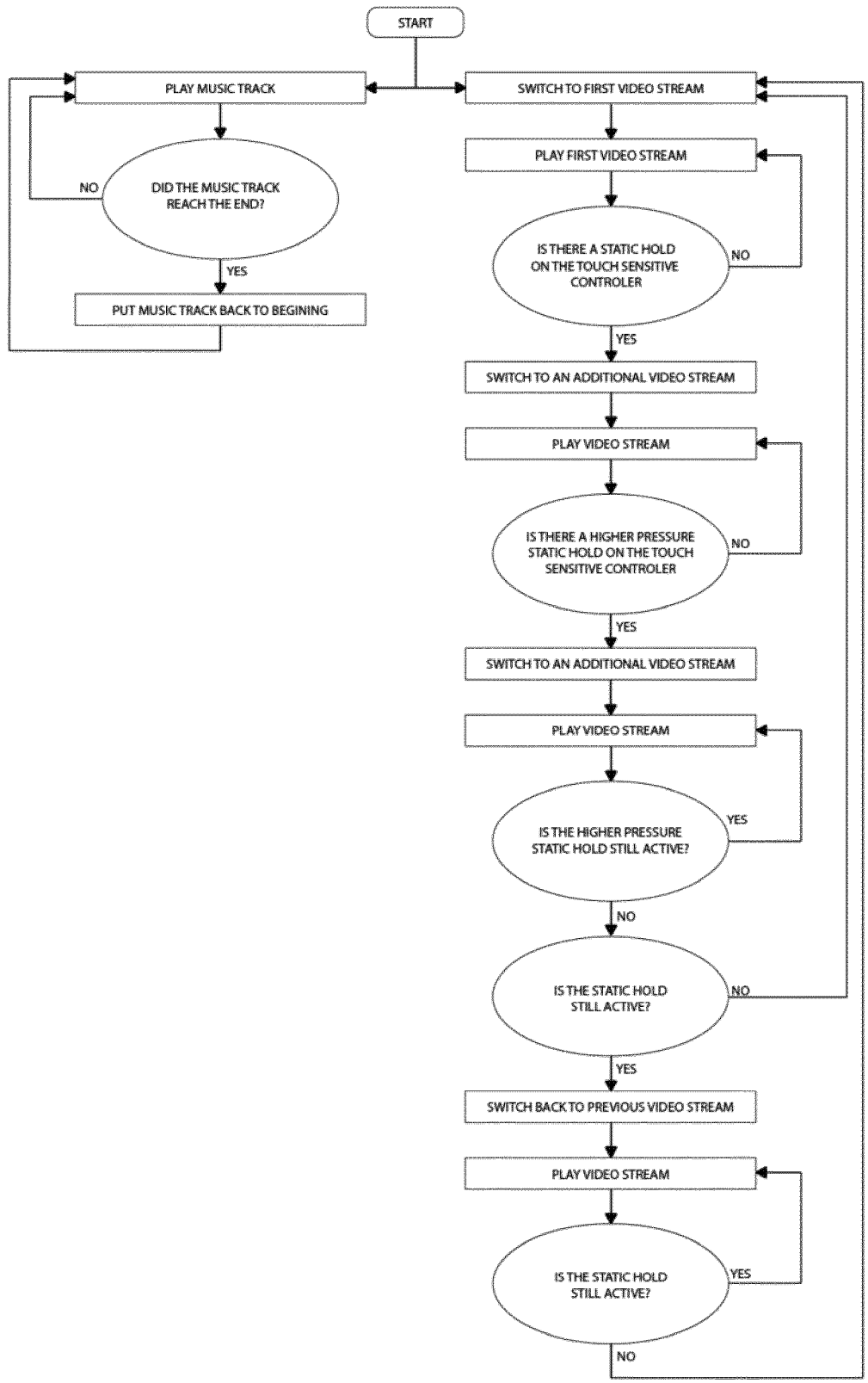

FIGS. 10-12 show possible flows of the system relating to different types of gestures and media files. A person of ordinary skill in the art will understand that the work flows depicted in the figures are meant for demonstration purposes and that the system may follow or otherwise provide other work flows as required. It is also understood that the system may perform or otherwise provide all or some of the acts depicted in the figures, none of the acts depicted in the figures, additional acts not depicted in the figures, or any combination thereof.

Although various gestures are described for switching between and among video files, those of skill in the art will understand, upon reading this description, that different and/or other gestures may be used and are contemplated herein.

It is understood by a person of ordinary skill in the art, upon reading this specification, that any or all of the features of the embodiments described or otherwise may be combined in any fashion, sequence, order, combination or any combination thereof. For example, the system may provide for the user to toggle between different streaming video files of different speeds as well as from different cameras at different vantage points, all in real time.

Conclusion

Where a process is described herein, those of ordinary skill in the art will appreciate that the process may operate without any user intervention. In another embodiment, the process includes some human intervention (e.g., a step is performed by or with the assistance of a human).

As used herein, including in the claims, the phrase "at least some" means "one or more," and includes the case of only one. Thus, e.g., the phrase "at least some ABCs" means "one or more ABCs", and includes the case of only one ABC.

As used herein, including in the claims, term "at least one" should be understood as meaning "one or more", and therefore includes both embodiments that include one or multiple components. Furthermore, dependent claims that refer to independent claims that describe features with "at least one" have the same meaning, both when the feature is referred to as "the" and "the at least one".

As used in this description, the term "portion" means some or all. So, for example, "A portion of X" may include some of "X" or all of "X". In the context of a conversation, the term "portion" means some or all of the conversation.

As used herein, including in the claims, the phrase "using" means "using at least," and is not exclusive. Thus, e.g., the phrase "using X" means "using at least X." Unless specifically stated by use of the word "only", the phrase "using X" does not mean "using only X."

As used herein, including in the claims, the phrase "based on" means "based in part on" or "based, at least in part, on," and is not exclusive. Thus, e.g., the phrase "based on factor X" means "based in part on factor X" or "based, at least in part, on factor X." Unless specifically stated by use of the word "only", the phrase "based on X" does not mean "based only on X."

In general, as used herein, including in the claims, unless the word "only" is specifically used in a phrase, it should not be read into that phrase.

As used herein, including in the claims, the phrase "distinct" means "at least partially distinct." Unless specifically stated, distinct does not mean fully distinct. Thus, e.g., the phrase, "X is distinct from Y" means that "X is at least partially distinct from Y," and does not mean that "X is fully distinct from Y." Thus, as used herein, including in the claims, the phrase "X is distinct from Y" means that X differs from Y in at least some way.

It should be appreciated that the words "first," "second," and so on, in the description and claims, are used to distinguish or identify, and not to show a serial or numerical limitation. Similarly, letter labels (e.g., "(A)", "(B)", "(C)", and so on, or "(a)", "(b)", and so on) and/or numbers (e.g., "(i)", "(ii)", and so on) are used to assist in readability and to help distinguish and/or identify, and are not intended to be otherwise limiting or to impose or imply any serial or numerical limitations or orderings. Similarly, words such as "particular," "specific," "certain," and "given," in the description and claims, if used, are to distinguish or identify, and are not intended to be otherwise limiting.

As used herein, including in the claims, the terms "multiple" and "plurality" mean "two or more," and include the case of "two." Thus, e.g., the phrase "multiple ABCs," means "two or more ABCs," and includes "two ABCs." Similarly, e.g., the phrase "multiple PQRs," means "two or more PQRs," and includes "two PQRs."

The present invention also covers the exact terms, features, values and ranges, etc. in case these terms, features, values and ranges etc. are used in conjunction with terms such as about, around, generally, substantially, essentially, at least etc. (i.e., "about 3" or "approximately 3" shall also cover exactly 3 or "substantially constant" shall also cover exactly constant).

As used herein, including in the claims, singular forms of terms are to be construed as also including the plural form and vice versa, unless the context indicates otherwise. Thus, it should be noted that as used herein, the singular forms "a," "an," and "the" include plural references unless the context clearly dictates otherwise.

Throughout the description and claims, the terms "comprise", "including", "having", and "contain" and their variations should be understood as meaning "including but not limited to", and are not intended to exclude other components unless specifically so stated.

It will be appreciated that variations to the embodiments of the invention can be made while still falling within the scope of the invention. Alternative features serving the same, equivalent or similar purpose can replace features disclosed in the specification, unless stated otherwise. Thus, unless stated otherwise, each feature disclosed represents one example of a generic series of equivalent or similar features.

The present invention also covers the exact terms, features, values and ranges, etc. in case these terms, features, values and ranges etc. are used in conjunction with terms such as about, around, generally, substantially, essentially, at least etc. (i.e., "about 3" shall also cover exactly 3 or "substantially constant" shall also cover exactly constant).

Use of exemplary language, such as "for instance", "such as", "for example" ("e.g.,") and the like, is merely intended to better illustrate the invention and does not indicate a limitation on the scope of the invention unless specifically so claimed.

While the invention has been described in connection with what is presently considered to be the most practical and preferred embodiments, it is to be understood that the invention is not to be limited to the disclosed embodiment, but on the contrary, is intended to cover various modifications and equivalent arrangements included within the scope of the appended claims.

What is claimed is:

1. A method comprising:
   (A) rendering a portion of first video on a display associated with a device; and
   (B) in response to a first user gesture and/or interaction on and/or with a touch-sensitive interface, (b)(1) selecting a second video, and (b)(2) rendering a portion of said second video on said display,
   wherein said first user gesture and/or interaction corresponds to a first time in said first video, and wherein said portion of said second video begins at a second time in said second video corresponding substantially to said first time in said first video,
   wherein said first video is at a first apparent speed and wherein said second video comprises a version of said first video stored at a second apparent speed distinct from said first apparent speed,
   the method
   further comprising:
   in response to said first user gesture and/or interaction, determining said second time, wherein said second time is determined based, at least in part, on said first time and on said first apparent speed and said second apparent speed.

2. The method of claim 1, wherein the first video plays in a first direction and wherein the second video comprises a version of the first video to play in a second direction, opposite said first direction.

3. The method of claim 2, wherein the first direction is a forward direction and the second direction is a reverse direction.

4. The method of claim 2, wherein the first video and the second video have the same duration.

5. The method of claim 1, wherein the first video and the second video are synchronized.

6. The method of claim 5, wherein the first video and the second video are synchronized using a time code.

7. The method of claim 1, wherein the first video was derived from the second video.

8. The method claim 1, wherein the second video is a modified version of the first video.

9. The method of claim 8, wherein the second video comprises aspects of the first video, modified to include images and/or text.

10. The method of claim 1, wherein the first video and the second video are stored on said device prior to said rendering in (A).

11. The method of claim 1 wherein said device stores multiple video files and wherein said selecting in (B) comprises selecting a particular file of said multiple video files.

12. The method of claim 11, wherein said multiple video files comprise video content stored at different apparent speed.

13. The method of claim 11, wherein said multiple video files comprise video of the same content recorded at the same time from different viewpoints.

14. The method of claim 1, further comprising: automatically playing the first video or playing the first video when the user selects the first video.

15. The method of claim 1, wherein at least one gesture and/or interaction is associated with a corresponding action, and wherein said first gesture and/or interaction corresponds to an action of switching from a current playing video to a stored video.

16. The method of claim 15, wherein said at least one gesture and/or interaction is selected from one or more of: simple touch, touch-and-hold, 3D touch, touch from another finger, higher-pressure touch, and swipe on the touch-sensitive interface.

17. The method of claim 1, further comprising: in response to said first gesture and/or interaction, rendering at least a portion of a 4th video before rendering said portion of said second video in (b)(1).

18. The method of claim 17, wherein said 4th video comprises sponsor or advertiser content.

19. The method of claim 17, wherein the 4th video is selected based on information about the user.

20. The method of claim 1, further comprising:
   (C) playing an audio track during said rendering in (A) and in (b)(1).

21. The method of claim 20, wherein the first video has a first audio track and the second video has a second audio track, and wherein the audio track played in (C) is distinct from the first audio track and from the second audio track.

22. The method of claim 20, wherein the audio track is played in (C) independent of which video is being rendered.

23. The method of claim 1, wherein the touch-sensitive interface is integrated in the display.

24. The method of claim 1, wherein the display is integrated in the device.

25. A system comprising:
   (a) hardware including memory and at least one processor, and
   (b) a service configured to run on said hardware, wherein said service is configured to:
   perform the method of claim 1.

26. An article of manufacture comprising non-transitory computer-readable media having computer-readable instructions stored thereon, the computer-readable instructions including instructions for implementing a computer-implemented method, said method operable on a device comprising hardware including memory and at least one processor and running a service on said hardware, said method comprising the method of claim 1.

27. The method of claim 1, further comprising:
   (C) in response to a second user gesture and/or interaction on and/or with said touch-sensitive interface, (C)(1) selecting a third video, and (b)(2) rendering a portion of said third video on said display,
   wherein said second user gesture and/or interaction corresponds to a second time in said second video, and wherein said portion of said third video begins at a third time in said third video corresponding substantially to said second time in said second video.

28. The method of claim 27, wherein the third video is the first video.

29. The method of claim 27, wherein the second user gesture and/or interaction comprises ceasing the first user gesture and/or interaction.

30. The method of claim 1, wherein the first gesture and/or interaction comprises a touch-and-hold interaction on said touch-sensitive interface, and wherein said second gesture and/or interaction comprises ceasing said touch-and-hold interaction.

\* \* \* \* \*